INVENTOR.
DAVID H. BRUSEAU
BY JAMES W. FRASURE
Kimmel & Crowell
ATTORNEYS.

United States Patent Office 3,250,562
Patented May 10, 1966

---

3,250,562
COMBINED HANDLE AND HOLDER MEANS FOR FLUID CARTONS
James W. Frasure and David H. Bruseau, both of 628 Daune St., Corvallis, Oreg.
Filed Dec. 19, 1963, Ser. No. 331,789
2 Claims. (Cl. 294—31.2)

This invention relates to a bottomless holder means for milk cartons and the like, and in particular, to a collapsible and storable type of holder having thereon an extending handle means for convenience of carrying and dispensing the contents of the container held thereby.

The present type of conventional wax impregnated paper milk containers have an outer slippery surface thereon that often results in the dropping of the filled container during handling and spilling the contents on the floor and the like.

The handle and holder combination of the present invention overcomes the above disadvantages by providing a portable, safe, and economical means of securely handling such containers.

It is a primary object of the present invention to provide a reusable and collapsible convenient means of handling milk cartons and the like without spillage of such contents therefrom.

Another object of the invention is to provide a dependable means of handling such containers without substantially coming in contact with a carrier's hands in a hospital and the like for sanitary reasons.

Another object of the invention is to provide an engageable and removable carrier and handle means for a container which is easily disposable when it becomes soiled or unsanitary for future use.

A further object of the present invention is to provide means of securely handling fluid containers.

With these and other objects in view, the invention includes certain novel features hereinafter described with reference to the drawing which accompanies and forms a part of this specification.

In the drawing.

Referring more specifically to the drawing, in which like reference numerals designate like parts in the exemplary embodiment of the present invention.

Figure 1:
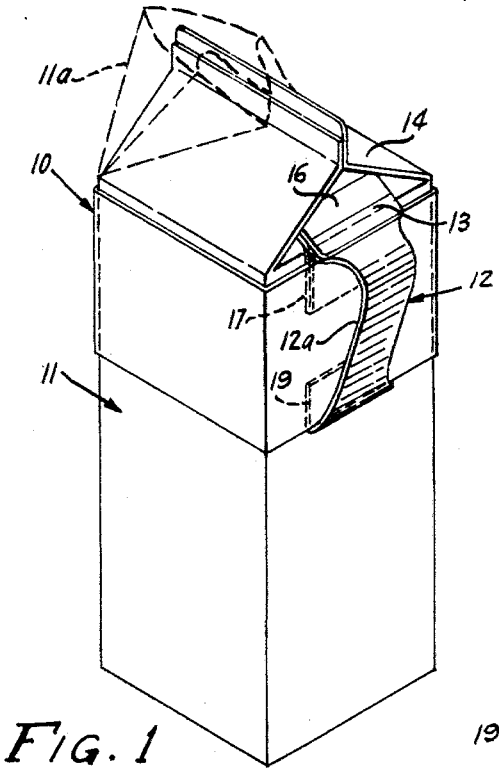
FIGURE 1 is a perspective view of the invention as placed on a conventional milk carton and the like preparatory to pouring the internal contents therefrom.

FIGURE 1 shows the relative position of the new holder means 10 having an outside surface 10a placed over a conventional milk carton 11 with handle means 12 having an upwardly extending portion 13 having a terminal lip portion 16 which securely engages the folded top portion 14 of the carton 11 opposite the pouring spout 11a.

Figure 2:
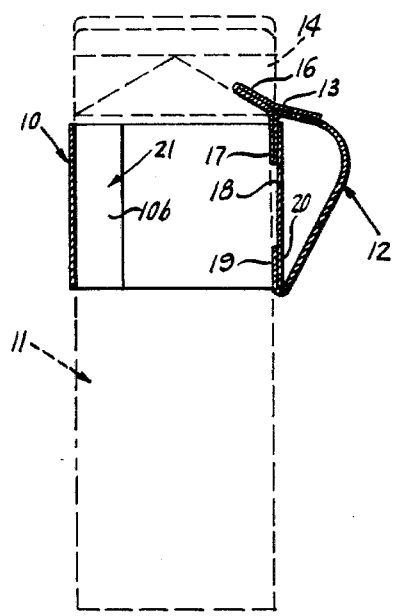
FIGURE 2 is a cross-sectional view of the new handle and holder combination for a conventional milk carton as shown in broken lines.

FIGURE 2 discloses in cross-section the folded pattern of handle means 12 in association with holder means 10. The end portion 16 of the upwardly extending portion 13 of the handle 12 is folded back on itself and extends downwardly as portion 17 to be secured in a suitable manner to the inside portion 18 of holder means 10. The lower end portion 19 is folded upwardly to be suitably secured to lower portion 20 of holder means 10. The ends of the material of holder means 10 overlap as indicated at 21 of FIGURES 2 and 4.

In use the tip or terminal lip portion 16 of folded portion 13 of handle means 12 engages the underside of folded top portion 14 of milk carton 11 as indicated in FIGURES 1 and 2.

Figure 3:
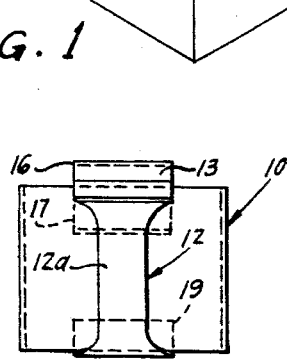
FIGURE 3 is a side elevational view of the new holder of this invention in cooperation with a hand grip means.

FIGURE 3 shows the rear arcuate shape of handle means 12 having the upwardly extending folded portion 13, folded down portion 17 and folded up portion 19 secured to holder means 10.

Figure 4:
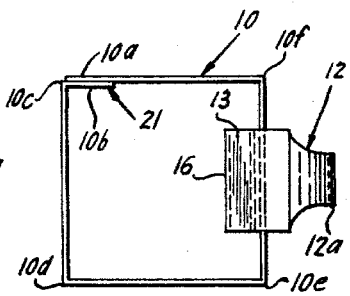
FIGURE 4 is a plan view of the new handle and holder combination of the present invention.

FIGURE 4 discloses a top view of handle means 12 assembled to holder means 10. Holder means 10 includes end portions 10a and 10b which are suitably secured together by adhesive or other means in overlapping relationship at 21 and folded corner creased portions 10c, 10d, 10e, and 10f.

Figure 5:
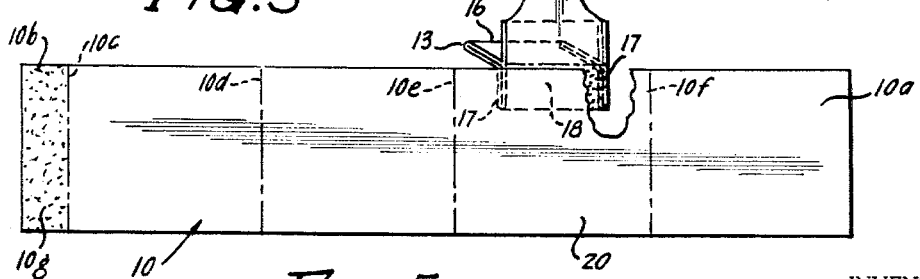
FIGURE 5 is a developed material layout view of the carton holder and handle means of the present invention before construction from paper, plastic, or other desired material.

FIGURE 5 shows holder means 10 and handle means 12 before assembly, the holder means 10 having an adhesive portion indicated by stippling at 10g between the edge and folded corner means 10c. The remaining portion of holder means 10 contains folded corner means 10d, 10e and 10f. Handle means 12 has the lower end portion 19 having adhesive means as indicated by stippling 19a, an intermediate handle portion 12a and an adhesive portion 17a as indicated by stippling of the upper end portion 17 with the intermediate folded portion 13 having the terminal lip portion 16.

In use the assembled holder means 10 and handle means 12 of the inventive combination is slid upwardly over the bottom portion of a milk carton 11 with the terminal lip portion 16 of the upwardly extending portion 13 forced inwardly to contact the underside of the upper folded portion 14 as shown in FIGURE 1.

To remove the handle and holder combination from carton 11, the lip portion 16 is bent backward to allow the combination to be slid downwardly off the container 11. Of course, if the conainer 11 has its spout means 11a closed as shown in full lines in FIG. 1, the device of the instant invention may be slid on and off the same over the top thereof.

From the foregoing it will now be seen that there is herein provided an improved compact and disposable holder and handle combination for milk cartons and the like which accomplishes all the objects of the invention, and others, including many advantages of great practical utility and commercial importance.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention set forth in the appended claims.

We claim:

1. A holder and handle combination for a normally vertical carton or the like of the class described, comprising side portions defining a holder including a bottomless aperture, said side portions adaptable to fixedly surrounding the flat side portions of a carton, outwardly extending handle means having a hand gripping portion extending away from said holder, an upper folded portion secured to the upper edge of said holder and a lower folded portion secured to an opposite lower edge portion of said holder, said handle means including an upwardly extending portion having a terminal folded rigid lip portion to supportably contact the lower surface of a folded top portion of a carton during handling, said upwardly extending portion of said handle means formed of two sections which are folded and adhesively secured together, and terminating in a downwardly extending end portion adhesively secured to the upper inside of one side portion of said holder, said lower folded handle portion being adhesively secured to the opposite lower inside of said one side portion of said holder.

2. A holder and handle combination for a normally vertically positioned container of the class described, having flat side portions and a recessed upper portion, said holder comprising side portions defining a bottomless recess for fixedly surrounding the flat side portions of a container, folded and outwardly extending handle means partially surrounding and secured to the opposite upper and lower edge portions of one side portion of said holder, said side portions comprising an elongated strip of carton material, means for securing the ends of said strip of material together, and folded corner means therein slidably to engage the external corner portions of a container, said handle means comprising an upwardly extended lip member formed by two sections folded along a fold line and secured together, and a portion extending downwardly from said lip member and secured to an upper; inside edge of a side portion of said holder, an outwardly extending handle portion having an upper portion secured to said lip portion, and a lower folded end portion secured to the opposite lower inside edge of said side portion of said holder, said lip portion of said handle means being adaptable to supportably engage the recessed upper portion of a container.

References Cited by the Examiner

UNITED STATES PATENTS

| | | | |
|---|---|---|---|
| 1,795,615 | 3/1931 | Parran | 294—31.2 X |
| 2,810,503 | 10/1957 | Krueger | 229—1.5 |
| 2,871,051 | 1/1959 | Nesslein | 294—31 |
| 3,017,215 | 1/1962 | Galipeau | 294—31 |

FOREIGN PATENTS

| | | |
|---|---|---|
| 596,719 | 4/1960 | Canada. |
| 654,079 | 12/1962 | Canada. |

GERALD M. FORLENZA, *Primary Examiner.*

SAMUEL F. COLEMAN, *Examiner.*

GEORGE F. ABRAHAM, *Assistant Examiner.*